United States Patent
Ushiki et al.

(12)

(10) Patent No.: US 6,793,066 B2
(45) Date of Patent: Sep. 21, 2004

(54) CONVEYING APPARATUS FOR PLATE-FORM MEMBERS

(75) Inventors: Hiroshi Ushiki, Iruma (JP); Kazunori Ota, Musashimurayama (JP); Shigeru Shiozawa, Higashiyamato (JP)

(73) Assignee: Kabushiki Kaisha Shinkawa, Tokyo (JP)

( * ) Notice: Subject to any disclaimer, the term of this patent is extended or adjusted under 35 U.S.C. 154(b) by 0 days.

(21) Appl. No.: 10/647,964

(22) Filed: Aug. 26, 2003

(65) Prior Publication Data

US 2004/0040823 A1 Mar. 4, 2004

(30) Foreign Application Priority Data

Aug. 28, 2002 (JP) ........................................ 2002-248159

(51) Int. Cl.[7] .............................................. B65G 25/02
(52) U.S. Cl. ................................ 198/621.1; 198/750.11; 414/17
(58) Field of Search ................................ 198/740, 620, 198/621.1, 750.11, 468.2, 468.9; 414/14, 17, 20

(56) References Cited

U.S. PATENT DOCUMENTS

| 4,217,068 A | * | 8/1980 | Fossard ........................ 414/20 |
| 4,540,084 A | * | 9/1985 | Curti ........................ 198/621.1 |
| 4,691,817 A | * | 9/1987 | Haar ........................ 198/468.2 |
| 4,958,722 A | * | 9/1990 | Kobayashi et al. ......... 198/740 |

FOREIGN PATENT DOCUMENTS

| JP | 63-56122 | 11/1988 |
| JP | 2835988 (4-294550) | 10/1998 |

\* cited by examiner

*Primary Examiner*—James R. Bidwell
(74) *Attorney, Agent, or Firm*—Koda & Androlia

(57) ABSTRACT

A plate-form member conveying apparatus that includes an upper claw and a lower claw for clamping a plate-form member in between from above and below and conveying the plate-form member, in which each of the upper claw and the lower claw is formed by a clamping plate made of an elastic material and brought into contact with an upper or lower surface of the plate-form member, and a claw holding plate and a claw counter plate that sandwich the clamping plate; and the clamping plate and claw holding plate are detachably fastened by bolts to the claw counter plate.

3 Claims, 2 Drawing Sheets

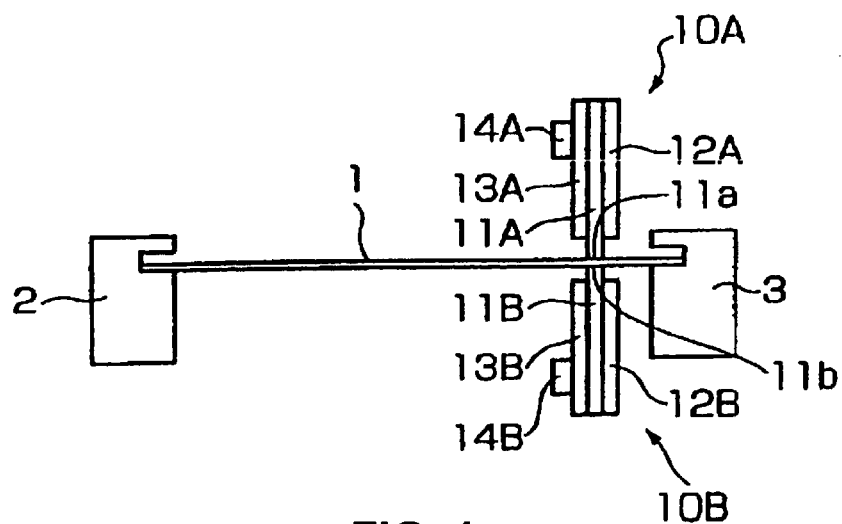
FIG. 1
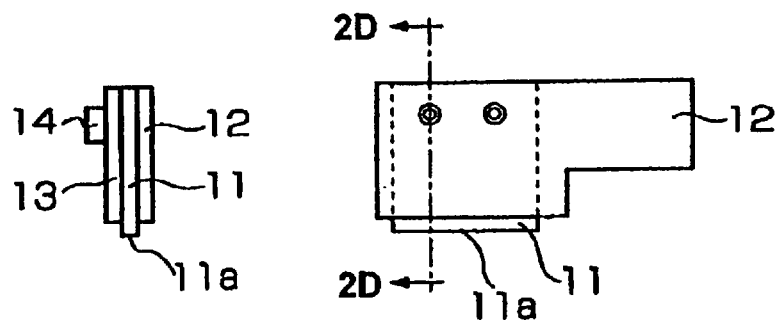
FIG. 2A  FIG. 2B
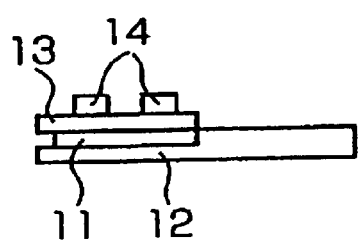 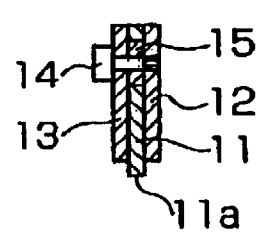
FIG. 2C  FIG. 2D ved by being held from above and below by metal-made upper and lower claws. In such a structure, in cases where the plate-form members are large and heavy (e.g., plate-form members with a width of 40 mm, a length of 400 mm and a thickness of 2 mm), conveying errors have occurred at the rate of one member in four. In order to prevent such conveying errors, some improvements have been made by increasing the size of the clamping surfaces of the upper claw and lower claw or roughening these surfaces. Even in such cases, however, conveying errors have occurred at the rate of one member in 16. In cases where the clamping surfaces of the upper and lower claws are thus made of metal, there is little friction; as a result, the plate-form members slip.

CONVEYING APPARATUS FOR PLATE-FORM MEMBERS

BACKGROUND OF THE INVENTION

1. Field of the Invention

The present invention relates to a conveying apparatus for plate-form members such as lead frames, substrates, etc. and more particularly to a claw structure that holds lead frames.

2. Prior Art

Conventionally, plate-form members, for instance, lead frames and substrates, are conveyed by plate-form member feeding mechanisms with both side edges of the plate-form members being guided by guide rails disposed so as to face each other in a parallel configuration. Such plate-form member conveying mechanisms have an upper claw and a lower claw that clamp or hold a plate-form member in between from above and below, a claw opening-and-closing mechanism that opens and closes the upper claw and lower claw (or moves the upper claw and lower claw toward and away from each other), and a claw feeding mechanism that causes the upper claw and lower claw to make a reciprocating motion in the conveying direction of the plate-form members. Accordingly, the plate-form members are conveyed one pitch at a time by a combination of the opening and closing movement of the upper and lower claws by the claw opening-and-closing mechanism and the reciprocating motion produced by the claw feeding mechanism in the conveying direction of the plate-form members.

The above system is disclosed in Japanese Patent Application Publication (Kokoku) No. 63-56122; and a similar system is disclosed in Japanese Patent No. 2835988 (that corresponds to Japanese Patent Application Publication No. 4-294550).

In the above prior art, the plate-form members are conveyed by being held from above and below by metal-made upper and lower claws. In such a structure, in cases where the plate-form members are large and heavy (e.g., plate-form members with a width of 40 mm, a length of 400 mm and a thickness of 2 mm), conveying errors have occurred at the rate of one member in four. In order to prevent such conveying errors, some improvements have been made by increasing the size of the clamping surfaces of the upper claw and lower claw or roughening these surfaces. Even in such cases, however, conveying errors have occurred at the rate of one member in 16. In cases where the clamping surfaces of the upper and lower claws are thus made of metal, there is little friction; as a result, the plate-form members slip.

Furthermore, in cases where die bonding or wire bonding is performed on the plate-form members, the plate-form members are heated by a heating block. There are cases in which the plate-form members are warped by this heat, so that the plate-form members cannot be held by the entire clamping surfaces of the upper and lower claws. In such cases as well, slipping occurs as a result of insufficient friction, resulting in conveying errors. Accordingly, in order to prevent conveying errors that involve warped plate-form members, a method is used so that the plate-form members are held by the upper and lower claws after warping has been eliminated by pressing the plate-form members with a warp-pressing member.

SUMMARY OF THE INVENTION

Therefore, the object of the present invention is to provide a conveying apparatus for plate-form members that conveys assuredly not only the plate-form members that are free of warping but also plate-form members that suffer from warping, and the alignment of the clamping surfaces of the upper claw and lower claw is easily accomplished, and the clamping plates is easily replaced.

The above object is accomplished by a unique structure of the present invention for a plate-form member conveying apparatus that includes an upper claw and a lower claw for clamping a plate-form member from above and below and conveying the plate-form member; and in the present invention, each of the upper claw and the lower claw is comprised of:

a clamping plate made of an elastic material and brought into contact with a surface of the plate-form member, and a claw holding plate and a claw counter plate that are disposed so as to sandwich the clamping plate; and the clamping plate and claw holding plate are detachably fastened by bolts to the claw counter plate.

In the above structure, the surfaces of the claw holding plate and the claw counter plate that face the leading edge of the plate-form member to be conveyed are formed so that such surfaces protrude toward the leading edge of the plate-form member from the clamping plate.

Furthermore, the elastic material can be a heat-resistant rubber.

BRIEF DESCRIPTION OF THE DRAWINGS

FIG. 1 is a front view of one embodiment of the plate-form member conveying apparatus according to the present invention.

FIG. 2A is a front view of the upper claw (that has substantially the same structure as the lower claw), FIG. 2B is a right-side view thereof, FIG. 2C is a top view, and FIG. 2D is a sectional view taken along the line 2D—2D in FIG. 2B.

DETAILED DESCRIPTION OF THE INVENTION

Figure 3A:
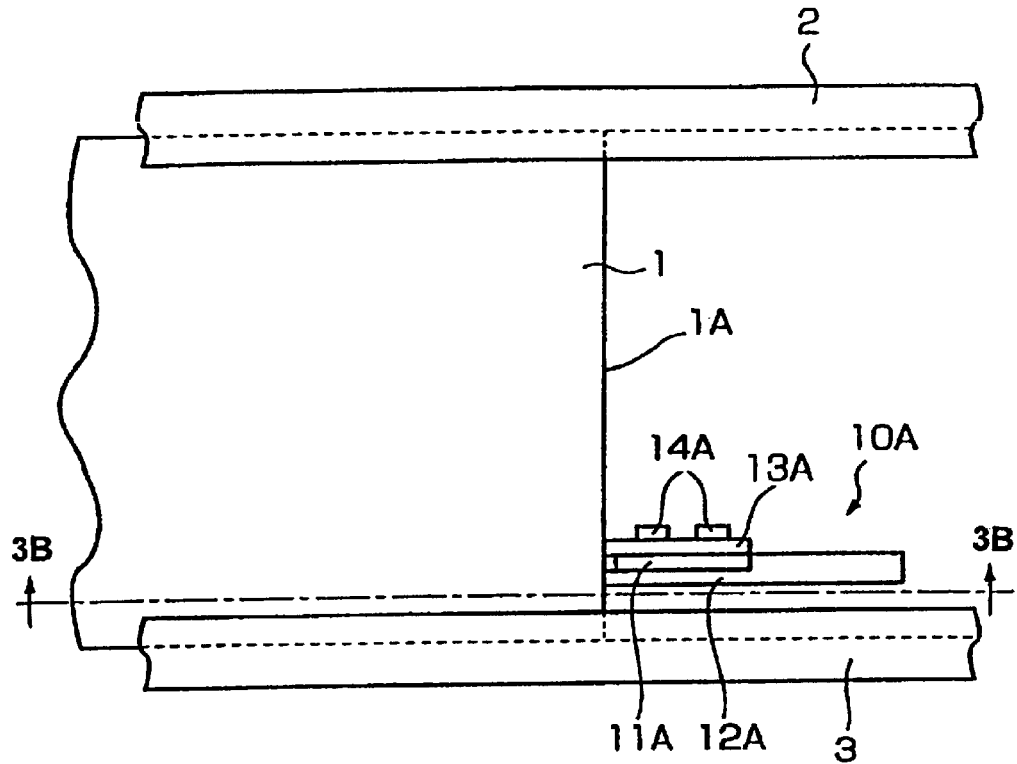
FIG. 3A shows from above the manner of aligning the plate-form members.

Embodiments of the present invention will be described with reference to FIGS. 1 through 2D.

As seen from FIG. 1, both side edges of the plate-form members 1 are guided by guide rails 2 and 3 that are disposed facing each other in a parallel configuration, and a plate-form member 1 such as a lead frame is clamped or held and conveyed by an upper claw 10A and a lower claw 10B. The upper claw 10A and lower claw 10B are opened and closed (or are moved toward and away from each other) by a claw opening-and-closing mechanism (not shown) and are conveyed in a conveying direction of the plate-form members 1, i. e. in the direction perpendicular to the surface of the drawing sheet of FIG. 1 by a claw feeding mechanism (not shown). The claw opening-and-closing mechanism and the claw feeding mechanism are well known; and therefore, a description of these mechanisms is omitted.

The upper claw 10A and lower claw 10B have the structures shown in FIGS. 2A through 2D. The upper claw 10A and the lower claw 10B have more or less the same structure; accordingly, in cases where there is a need in the below to distinguish between the two claws, the letter "A" will be appended to the symbols assigned to the members of the upper claw 10A, and the letter "B" will be appended to the symbols assigned to the members of the lower claw 10B.

In each of the upper and lower claws 10A and 10B, a clamping plate 11 is sandwiched between a claw holding plate 12 and a claw counter plate 13 and is fastened in place by bolts 14 to the claw counter plate 13 in a detachable manner. The clamping plate 11 is made of an elastic material; and the upper clamping plate 11A and the lower clamping plate 11, respectively, come into contact with the upper and lower surfaces of the plate-form member 1, thus clamping or holding the plate-form member 1 in between. Furthermore, collars 15 are disposed in the insertion portions for the bolts 14 in the clamping plate 11. The clamping surface 11a of the upper clamping plate 11A of the upper claw 10A protrudes downward beyond the claw holding plate 12A and claw counter plate 13A. The clamping surface 11b of the lower clamping plate 11B of the lower claw 10B protrudes upward beyond the claw holding plate 12B and claw counter plate 13B. The claw holding plates 12A and 12B are attached to a claw opening-and-closing mechanism (not shown).

The elastic material constituting the upper and lower clamping plates 11A and 11B is heated by a heating block when used in a bonding apparatus. Accordingly, the clamping plates 11 are preferably a heat-resistant rubber that can be used at temperatures of 150° C. to 300° C. Desirable examples of heat-resistant rubbers include butyl rubber, ethylene-propylene rubber, silicone rubber, and fluorine-containing rubber.

The conveying of the plate-form members 1 is accomplished in the following manner: As seen from FIG. 1, the upper claw 10A and lower claw 10B are caused to move horizontally one pitch by a claw feeding mechanism (not shown) with the upper claw 10A and lower claw 10B in a closed state. Next, the upper claw 10A and lower claw 10B are opened (or moved away from each other in the vertical direction) by the claw opening-and-closing mechanism (not shown). Then, the upper claw 10A and lower claw 10B are caused to move back horizontally to the original position (or in the opposite direction from the conveying direction of the plate-form members 1) by the claw feeding mechanism. The plate-form member 1 is thus conveyed by one pitch.

Since the clamping plates 11A and 11B are made of an elastic material, the friction of the clamping surfaces 11a and 11b is large, and slipping relative to the upper and lower surfaces of the plate-form member 1 is prevented. Thus, no deviations would occur during feeding of the plate-form member 1. In cases where the plate-form member 1 that is being conveyed is warped, the clamping plates 11A and 11B can undergo elastic deformation so that the plate-form member 1 is held by the entire surfaces of the clamping surfaces 11a and 11b. Thus, slipping on the clamping surfaces 11a and 11b would not occur. Actual tests done by the inventors indicate that no conveying errors occurred in conveying 128 plate-form members. Since as described above the clamping surfaces 11a and 11b of the clamping plates 11A and 11B undergo elastic deformation when the clamping plates 11A and 11B hold the plate-form members 1, the alignment of the clamping surfaces 11a and 11b can easily be accomplished, and the alignment time can be shortened.

The durability of the heat-resistant rubber is inferior to that of a metal. Accordingly, by taking the structure in which the clamping plates 11 are sandwiched by the claw holding plates 12 and claw counter plates 13, and the clamping plates 11 are fastened in place by bolts 14 as in the shown embodiment, it is possible to replace only the clamping plates 11, and costs can be reduced.

Figure 3B:
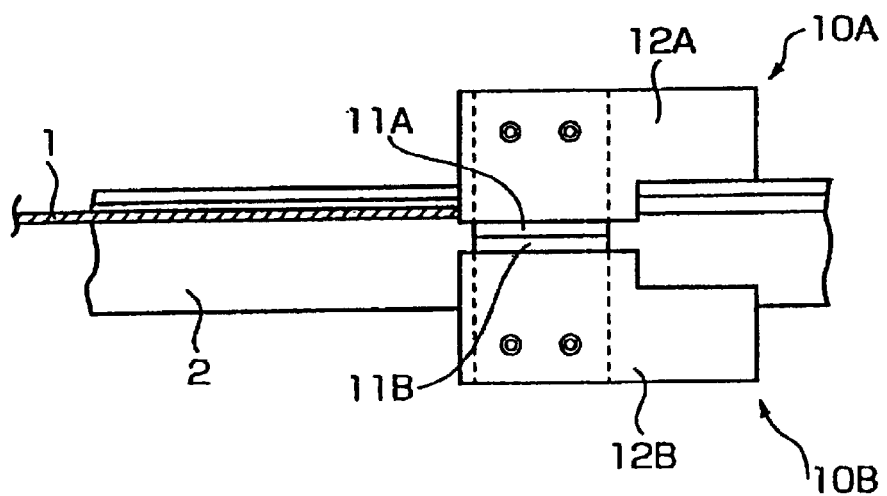
FIG. 3B is the sectional view taken along the line 3B—3B in FIG. 3A.

As described in Japanese Patent Application Publication (Kokoku) No. 63-56122 cited in the Prior Art section above, there are cases in which a positioning needs to be made for plate-form members 1 using the upper and lower claws when the plate-form members 1 are fed out from a loader (not shown). In the shown embodiment, in order to perform such positioning of the plate-form members 1, as best seen from FIG. 2C and FIGS. 3A and 3B, the surfaces of the claw holding plate 12A and claw counter plate 13A of the upper claw 10A that face the tip end or the leading edge 1A of the plate-form member 1 (horizontally) protrude further toward the tip end or the leading edge of the plate-form member 1 than the clamping plate 11A and clamping plate 11B; and likewise, the surfaces of the claw holding plate 12B and claw counter plate 13B of the lower claw 10B that face the tip end or the leading edge 1A of the plate-form member 1 (horizontally) protrude further toward the tip end or the leading edge of the plate-form member 1 than the clamping plate 11A and clamping plate 11B. With this structure, the tip end or leading edge 1A of the plate-form member 1 is accurately aligned when it comes into contact with the claw holding plate 12A and claw counter plate 13A of the upper claw 11A and/or the claw holding plate 12B and claw counter plate 13B of the lower claw 11B.

More specifically, as seen from FIG. 3, when the plate-form member 1 is to be aligned, the claw holding plate 12A and claw counter plate 13A of the upper claw 10A are lowered so that these plates are positioned in the conveying path of the plate-form member 1, and the plate-form member 1 fed out from the loader is aligned when the tip end or the leading edge 1A of this plate-form member comes into contact with the claw holding plate 12A and claw counter plate 13A of the upper claw 10A. It goes without saying that the lower claw 10B can be raised so that the alignment of positioning of the plate-form member 1 is done by the claw holding plate 12B and claw counter plate 13B of the lower claw 10B.

Of course, in cases where alignment the plate-form members 1 is not performed by the upper claw 10A and/or the lower claw 10B, the surfaces of the claw holding plate 12A and claw counter plate 13A of the upper claw 10A and claw holding plate 12B and claw counter plate 13B of the lower claw 10B can be formed flush with the surfaces of the clamping plate 11A and clamping plate 11B.

In the above embodiment, the clamping plates 11A and 11B are formed entirely from an elastic material. However, it is also possible to form only the clamping surfaces 11a and 11b from an elastic material.

As seen from the above, in the conveying apparatus for plate-form members of the present invention that includes upper and lower claws for holding plate-form members in between from above and below and conveys the plate-form members, the upper claw and the lower claw each comprise a clamping plate which is made of an elastic material and comes into contact with a surface of the plate-form member, and a claw holding plate and claw counter plate that are disposed so as to sandwich the clamping plate, and the clamping plate and claw holding plate are fastened by bolts to the claw counter plate in a detachable manner. Accordingly, not only plate-form members that are free of warping but also plate-form members that are warped are conveyed securely. In addition, alignment of the clamping surfaces of the upper claw and lower claw can easily be accomplished, and replacement of the clamping plates is also accomplished easily.

What is claimed is:

1. A conveying apparatus for plate-form members, said apparatus including an upper claw and a lower claw that hold a plate-form member from above and below and convey said plate-form member, each of said upper claw and said lower claw comprises:

a clamping plate made of an elastic material and brought into contact with a surface of said plate-form member, and a claw holding plate and a claw counter plate that are disposed so as to sandwich said clamping plate, wherein said clamping plate and claw holding plate are fastened by a bolt to said claw counter plate in a detachable manner.

2. The conveying apparatus according to claim 1, wherein surfaces of said claw holding plate and said claw counter plate that face a leading edge of said plate-form member are formed so that said surfaces protrude toward said leading edge of said plate-form member from said clamping plates.

3. The conveying apparatus for plate-form members according to claim 1, wherein said elastic material is a heat-resistant rubber.

* * * * *